(12) United States Patent
Chen

(10) Patent No.: US 8,911,081 B2
(45) Date of Patent: Dec. 16, 2014

(54) NYLON POLARIZED LENS AND MOULDING MOLD THEREOF

(75) Inventor: Yu-Hsiang Chen, Xiamen (CN)

(73) Assignee: Xiamen Hongtai Electronic Optical Co., Ltd., Xiamen, Fujian (CN)

( * ) Notice: Subject to any disclaimer, the term of this patent is extended or adjusted under 35 U.S.C. 154(b) by 0 days.

(21) Appl. No.: 13/696,072

(22) PCT Filed: Oct. 11, 2011

(86) PCT No.: PCT/CN2011/080623
§ 371 (c)(1),
(2), (4) Date: Nov. 3, 2012

(87) PCT Pub. No.: WO2012/142818
PCT Pub. Date: Oct. 26, 2012

(65) Prior Publication Data
US 2014/0028970 A1  Jan. 30, 2014

(30) Foreign Application Priority Data

Apr. 22, 2011 (CN) .......................... 2011 1 0102253

(51) Int. Cl.
*G02C 3/00* (2006.01)
*B29D 11/00* (2006.01)
*G02C 7/12* (2006.01)

(52) U.S. Cl.
CPC ...... *B29D 11/0049* (2013.01); *B29D 11/00644* (2013.01); *B29D 11/0073* (2013.01); *G02C 7/12* (2013.01); *B29D 11/0048* (2013.01)
USPC ...................................................... 351/159.56

(58) Field of Classification Search
CPC .............. G02C 7/02; G02C 7/04; G02C 7/12; G02C 7/10
USPC ............. 351/159.01, 159.02, 159.27, 159.56, 351/159.62, 159.73; 359/642, 483
See application file for complete search history.

(56) References Cited

U.S. PATENT DOCUMENTS

2002/0044352 A1\* 4/2002 Yamamoto et al. ........... 359/483

\* cited by examiner

*Primary Examiner* — James Greece

(57) ABSTRACT

A nylon polarized lens includes a nylon material layer and a polarized film. The nylon material layer has four corners formed with positioning portions to position the polarized film. The nylon material layer has buffer grooves at two opposing end surfaces thereof. A moulding mold to manufacture a nylon polarized lens includes an upper die and a lower die. The lower die has a top surface which is an arc concave surface. Two opposing sides of the top surface of the lower die are formed with buffer flanges which are adapted to form buffer grooves of the nylon polarized lens. The top surface of the lower die is further formed with positioning portions to position the polarized film. The upper die has a bottom surface which is an arc convex surface. The upper die cooperates with the lower die to form a chamber for shaping the lens.

8 Claims, 9 Drawing Sheets

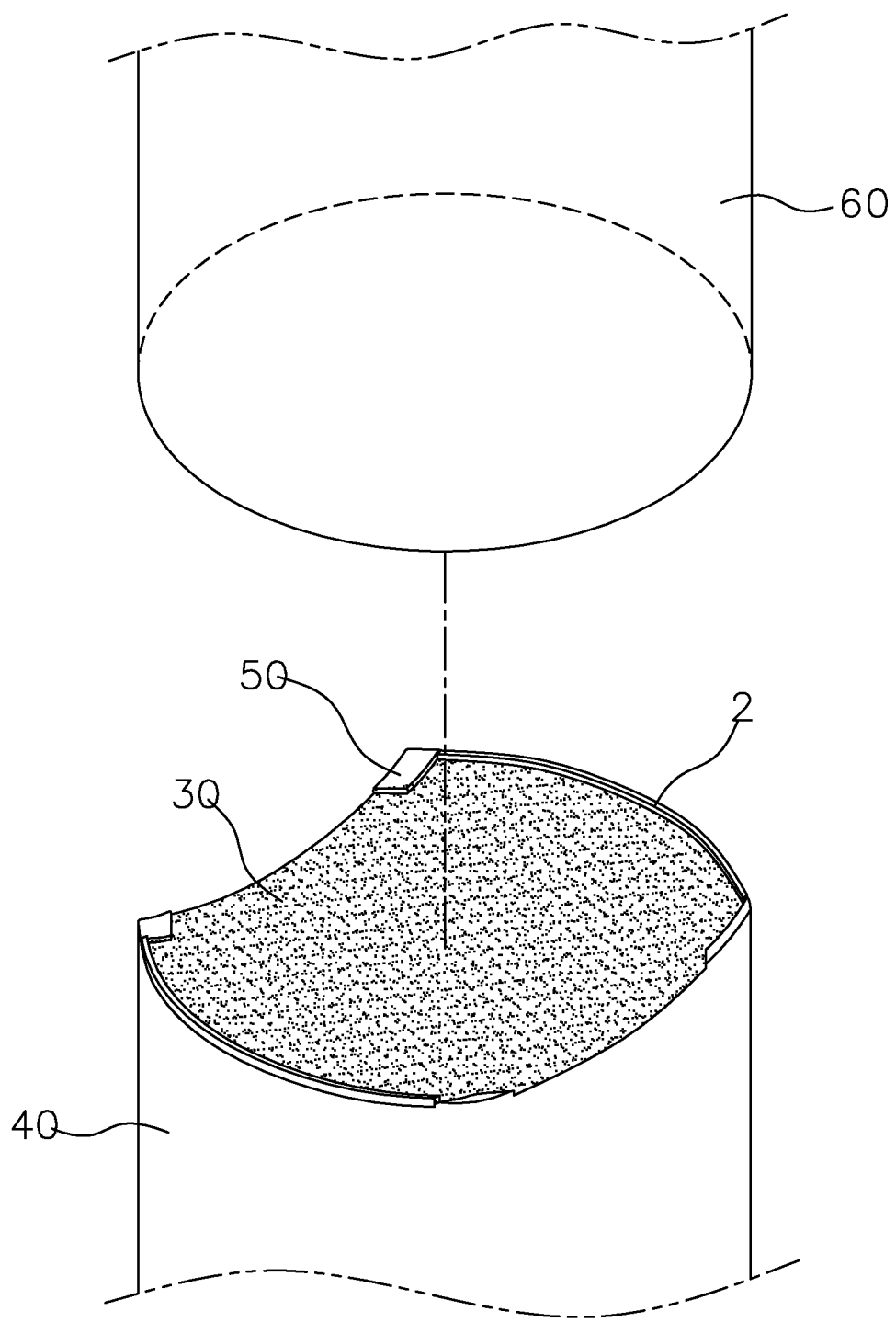
F I G. 9

NYLON POLARIZED LENS AND MOULDING MOLD THEREOF

BACKGROUND OF THE INVENTION

1. Field of the Invention

The present invention relates to a nylon polarized lens and a moulding mold thereof.

2. Description of the Prior Art

Most conventional polarized lenses are made of PC material (polycarbonate) because the PC lenses are light, durable and environmental-friendly. The weight of the PC lens is about one tenth of the weight of a glass lens and half of the weight of a resin lens. The PC lens has the physical properties of anti-strike and anti-deformation, which won't break and is a safe lens. The thermosetting plastic can be recycled for other products. But, the PC lens doesn't have the property of anti-acidity, so it can't be used for popular frames. During injection, the PC polarized lens will is generate inner stress. When assembled to an eyeglasses frame, the PC lens has the phenomenon of stress concentration, particularly, to a metal frame. Even if it is not obvious when assembled, the phenomenon of stress concentration still exists after the plastic frame is used for a period of time. The color of the edge of the lens may change, or the lens may break. The PC material is not adapted for drilling. Therefore, the polarized lens must be improved.

Nylon lens is also light, endurable and environmental-friendly and has low stress. Compared to the PC lens, the nylon lens can be processed better for expensive lenses. The current trend is to use nylon material for manufacturing high-class polarized lenses.

Chinese Utility Model Patent No. 200620118294.9 is the applicant's invention for connection of polarized film and lens, titled "mold device to form eyeglasses lens and eyeglasses lens. As shown in FIG. 1, a polarized lens 10 is formed with four recesses 20 (positioning portions) at four corners thereof. An outer surface of an area surrounded by the four recesses 20 is adapted to bond a polarized film 30. This patent also discloses a mold device to form the eyeglasses lens. As shown in FIG. 2, the mold device comprises a lower ide 40 and an upper die 60. The top surface of the lower die 40 is formed with four protruding portions 50 (corresponding to the positioning portions) at four corners thereof. The area surrounded by the four protruding portions 50 is adapted to bond the polarized film 30. The upper die 60 cooperates with the lower die 40 to form a space for injecting melting plastic to be hardened as the eyeglasses lens 10. During processing, the polarized film 30 is secured on the lower die 40 by the protruding portions 50, and then the upper die 60 and the lower die 40 are closed to form the injection space S for injection. As shown in FIG. 3, the melting plastic and the polarized film 30 are bonded together to be the polarized lens 10. As shown in FIG. 4, a layer of adhesive glue 70 is attached to the surface of the polarized film 30. When the polarized film 30 is cut, the adhesive force of the adhesive glue 70 is lowered. During injection, as shown in FIG. 5, the melting plastic 70 is poured into the injection space S, which is directly is flushed to the edge of the polarized film 30 and may flush the adhesive glue 70 away. The surface of the lens may have ripples as shown in FIG. 6 to influence the quality of products. In order to avoid the glue to be flushed away, a plastic layer 90 is attached to the adhesive glue 70 of the polarized film 30. As shown in FIG. 7, through the protection of the plastic layer 90, the adhesive glue 70 won't be flushed away by the melting plastic 80 during injection. In this way, the quality of products can be ensured to increase the yield rate. However, the thickness of the lens is about 3 mm. This patent is not adapted to manufacture thin polarized lenses. The lens uses more material, so it is not applied to expensive polarized lenses, such as nylon polarized lenses. It is necessary to improve the nylon polarized lens structure and the moulding mold thereof. Accordingly, the inventor of the present invention has devoted himself based on his many years of practical experiences to solve these problems.

SUMMARY OF THE INVENTION

The primary object of the present invention is to provide a nylon polarized lens and a moulding mold thereof applied to manufacture thin and expensive polarized lenses so as to increase the yield rate and to enhance the quality of the products.

According to one aspect of the present invention, there is provided a nylon polarized lens which comprises a nylon material layer and a polarized film. The nylon material layer has four corners formed with positioning portions to position the polarized film. The nylon material layer has buffer grooves at two opposing end surfaces thereof.

Preferably, the nylon material layer has two positioning flat surfaces at two opposing sides thereof. The two positioning flat surfaces have protrusions formed at four corners of the two positioning flat surfaces.

Preferably, the four corners of the nylon material layer are formed with apertures for insertion of positioning needles of a mold to position the polarized film.

Preferably, the four corners of the nylon material layer are formed with concaved portions. An outer surface of an area surrounded by the four concaved portions is adapted to bond the polarized film.

According to another aspect of the present invention, there is provided a moulding mold to manufacture a nylon polarized lens. The moulding mold comprises an upper die and a lower die. The lower die has a top surface which is an arc concave surface. Two opposing sides of the top surface of the lower die are formed with buffer flanges which are adapted to form buffer grooves of the nylon polarized lens. The top surface of the lower die is further formed with positioning portions to position the polarized film. The upper die has a bottom surface which is an arc convex surface. The upper die cooperates with the lower die to form a chamber for shaping the lens.

Preferably, the top surface of the lower die is formed with two platforms which are adapted to form two positioning surfaces of the nylon polarized lens. The two platforms have concave holes at four corners thereof. The concave holes are adapted to form protrusions.

Preferably, the top surface of the lower die is formed with positioning needles to position the polarized film.

Preferably, four corners of the top surface of the lower die are formed with four protruding portions. An area surrounded by the four protruding portions is adapted to bond the polarized film.

The present invention is provided with the buffer grooves. The moulding mold is provided with the buffer flanges. During injection molding, the melting plastic is injected into the injection space and stopped by the buffer flanges, not on the edge of the polarized film to flush adhesive glue. This way can prevent the adhesive glue from being flushed to ensure the quality of products to enhance the work efficiency. There is no need for a plastic layer to be attached to the adhesive glue of the polarized film of the present invention. The adhesive glue is direct attached to the surface of the polarized film, without sticking the plastic layer in advance. The thickness of the thin lens is about 2 mm to save the plastic material. The present invention is applied to manufacture nylon polarized lens which has a high price. The present invention can ensure the quality of products and increase the work efficiency and enhance the product level.

BRIEF DESCRIPTION OF THE DRAWINGS

FIG. 9 is an exploded view showing the moulding mold for the polarized lens according to the first embodiment of the present invention;

DETAILED DESCRIPTION OF THE PREFERRED EMBODIMENTS

Embodiments of the present invention will now be described, by way of example only, with reference to the accompanying drawings.

Figure 1:
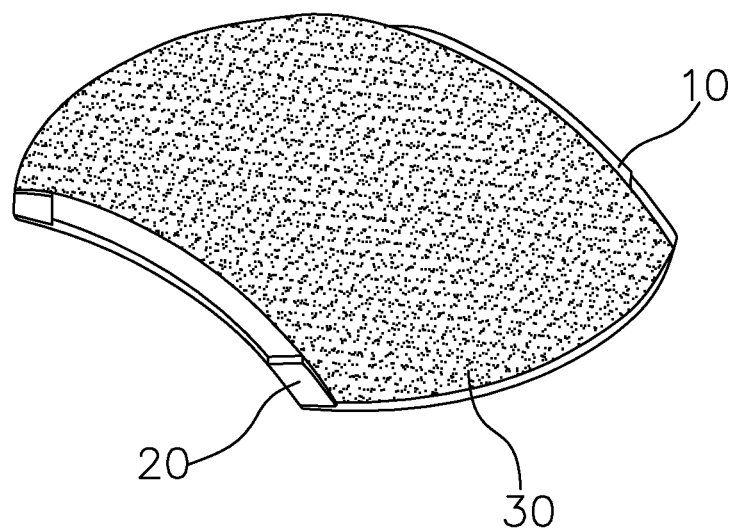
FIG. 1 is a perspective view of a conventional polarized lens.
Figure 2:
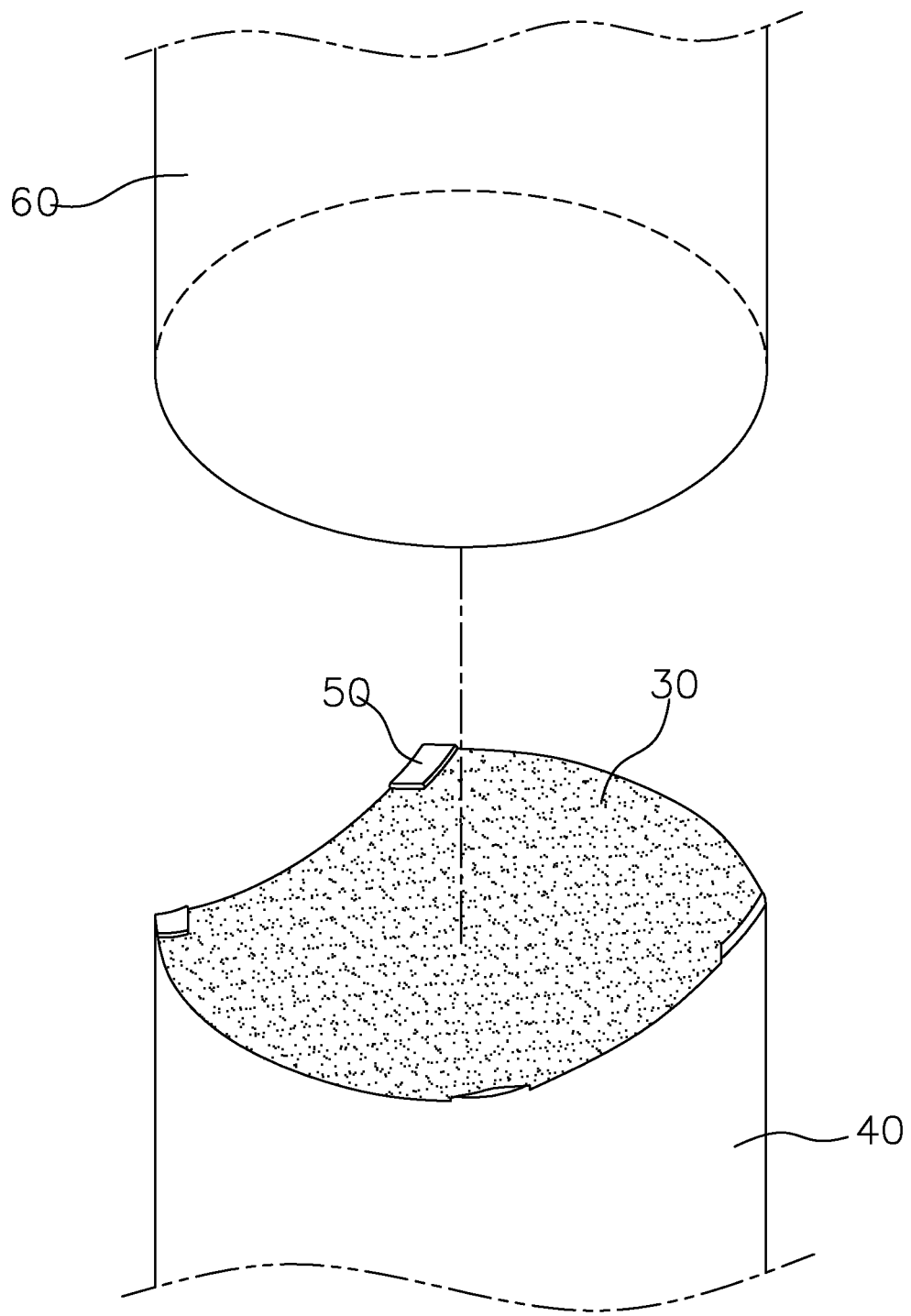
FIG. 2 is an exploded view showing the moulding mold for the conventional polarized lens.
Figure 3:
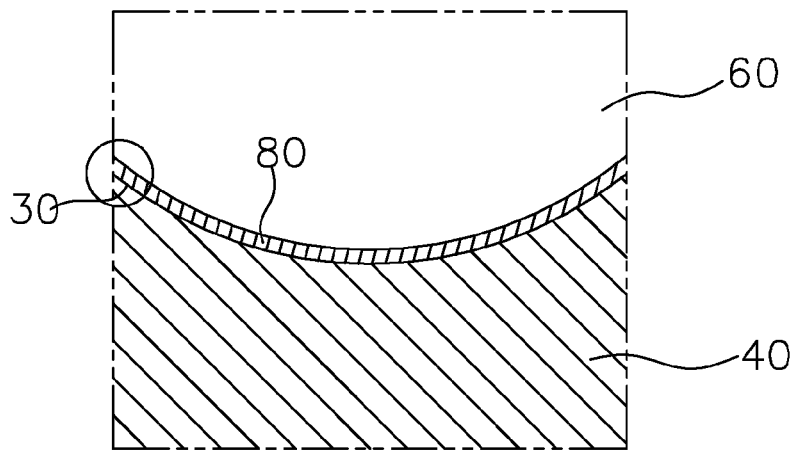
FIG. 3 is a schematic showing the mold closing of the moulding mold for the conventional polarized lens.
Figure 4:
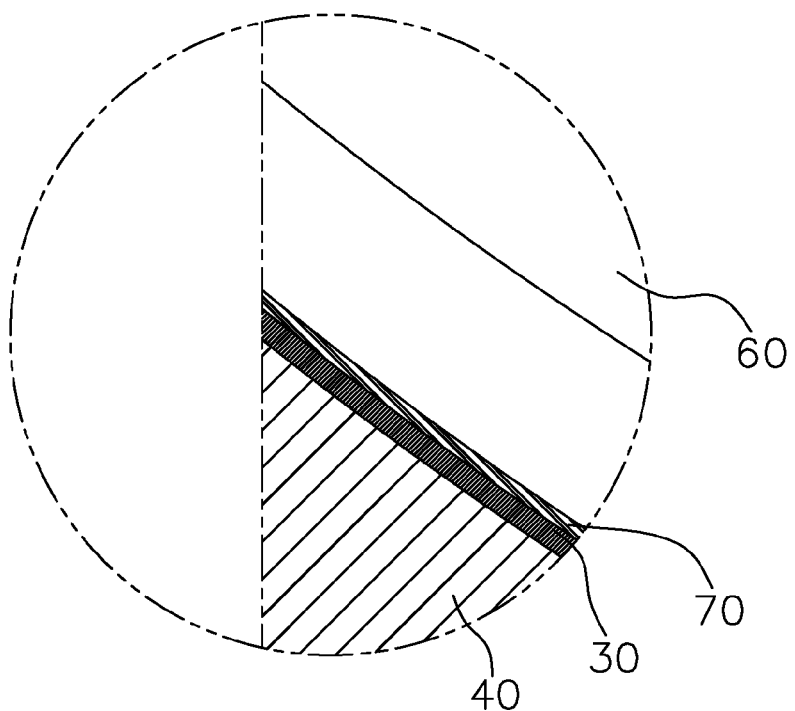
FIG. 4 is an enlarged side view of the conventional polarized lens.
Figure 5:
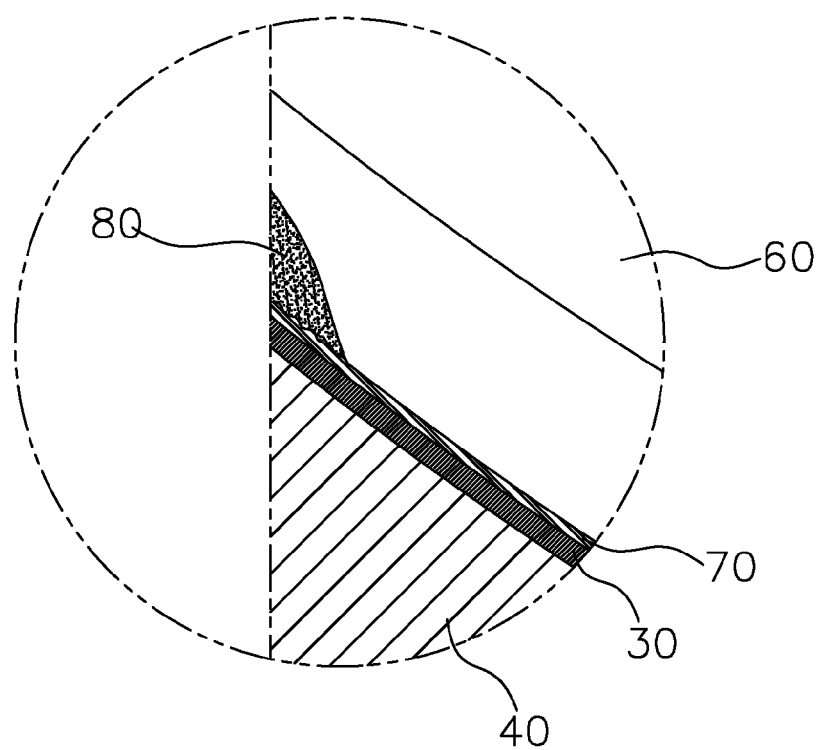
FIG. 5 is a schematic showing the injection of the conventional polarized lens when moulding.
Figure 6:
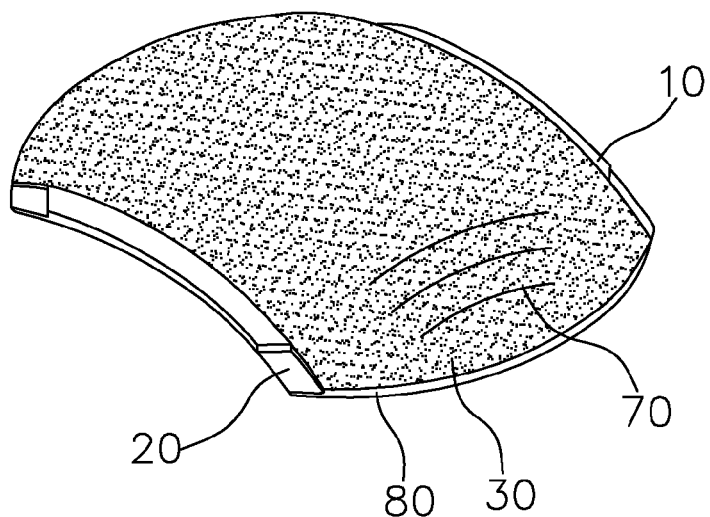
FIG. 6 is a perspective view showing the defective product of the conventional polarized lens.
Figure 7:
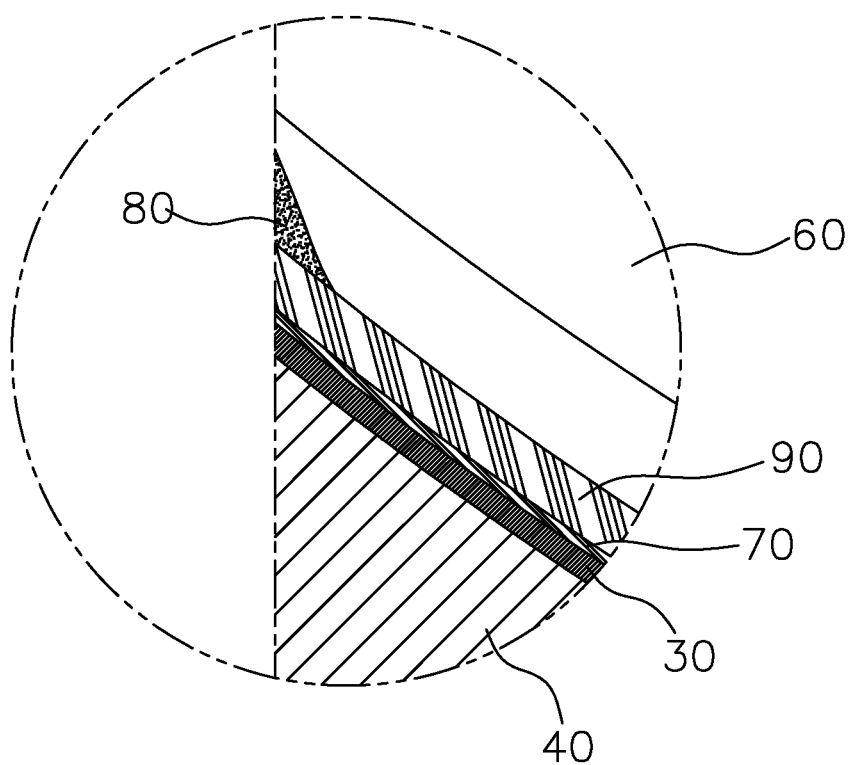
FIG. 7 is a schematic showing the injection of the conventional polarized lens with a plastic layer when moulding.
Figure 8:
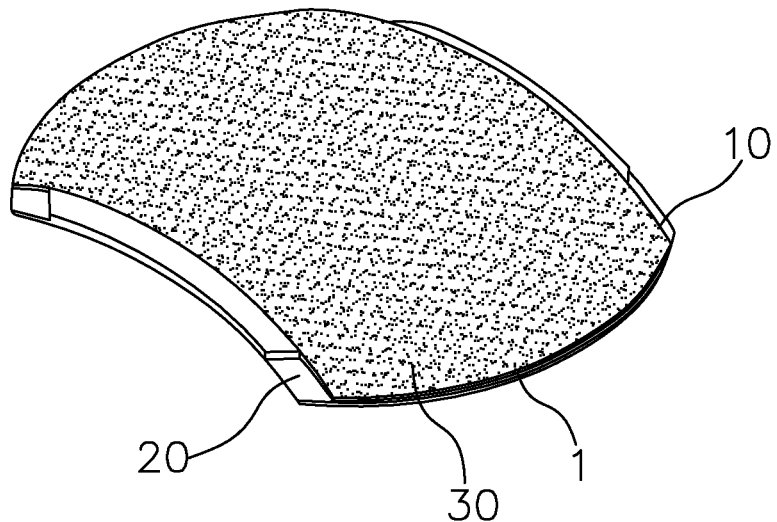
FIG. 8 is a perspective view showing the polarized lens according to a first embodiment of the present invention.

As shown in FIG. 8, the nylon polarized lens according to a first embodiment of the present invention comprises a nylon material layer 100 and a polarized film 30. The nylon material layer 100 has four corners formed with positioning portions which are adapted to position the polarized film 30. The positioning portions may be in different embodiments. As shown in FIG. 8, the positioning portions are concaved portions 20. An outer surface of an area surrounded by the four concaved portions 20 is adapted to bond the polarized film 30. The feature of the present invention is that the nylon material layer 100 has buffer grooves 1 at two opposing end surfaces thereof.

Figure 10:
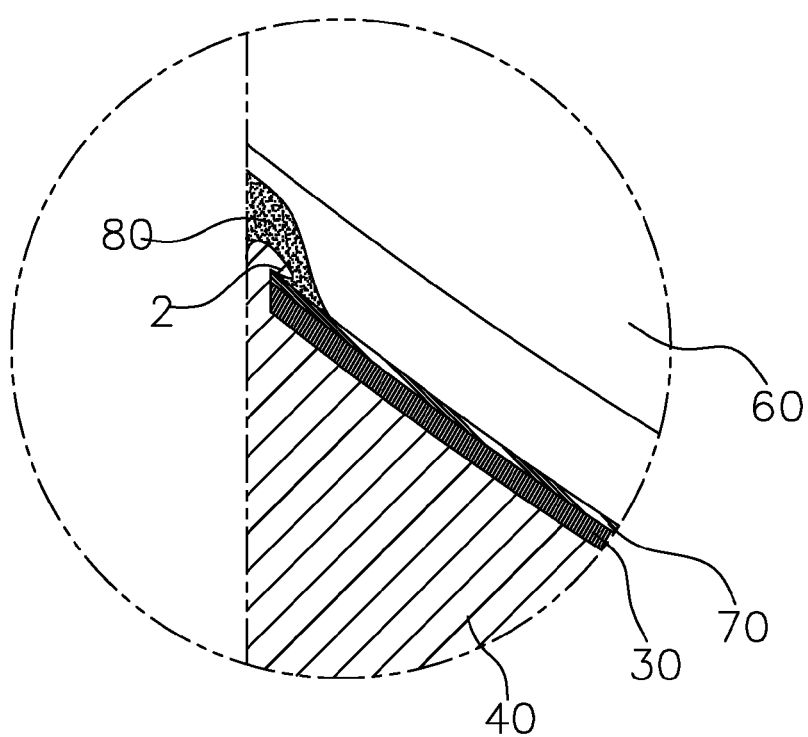
FIG. 10 is a schematic showing the mold closing of the moulding mold for the polarized lens according to the first embodiment of the present invention.

As shown in FIG. 9 and FIG. 10, the moulding mold to manufacture the aforesaid nylon polarized lens comprises an upper die 60 and a lower die 40. The lower die 40 has a top surface which is an arc concave surface. Two opposing sides of the top surface of the lower die 40 are formed with buffer flanges 2 which are adapted to form the buffer grooves 1 of the nylon polarized lens. The top surface of the lower die 40 is further formed with positioning portions to position the polarized film 30. As shown in FIG. 9, four corners of the top surface of the lower die 40 are formed with protruding portions 50 to constitute the positioning portions. An area surrounded by the four protruding portions 50 is adapted to bond the polarized film 30. The upper die 60 has a bottom surface which is an arc convex surface. The upper die 60 cooperates with the lower die 40 to form a chamber for shaping the lens.

As shown in FIG. 10, during the injection molding of this embodiment, the melting plastic 80 is injected into the injection space and stopped by the buffer flanges 2, not on the edge of the polarized film 30 to flush the adhesive glue 70. This way can prevent the adhesive glue from being flushed. Thus, there is no need for the plastic layer 90 to be attached to the adhesive glue 70 of the polarized film 30 of the present invention. The adhesive glue 70 is direct attached to the surface of the polarized film 30, without sticking the plastic layer 90 in advance. The thickness of the thin lens is about 2 mm to save the plastic material. The present invention is applied to manufacture high-class nylon polarized lenses. The present invention can ensure the quality of products and increase the work efficiency and enhance the product level.

Figure 11:
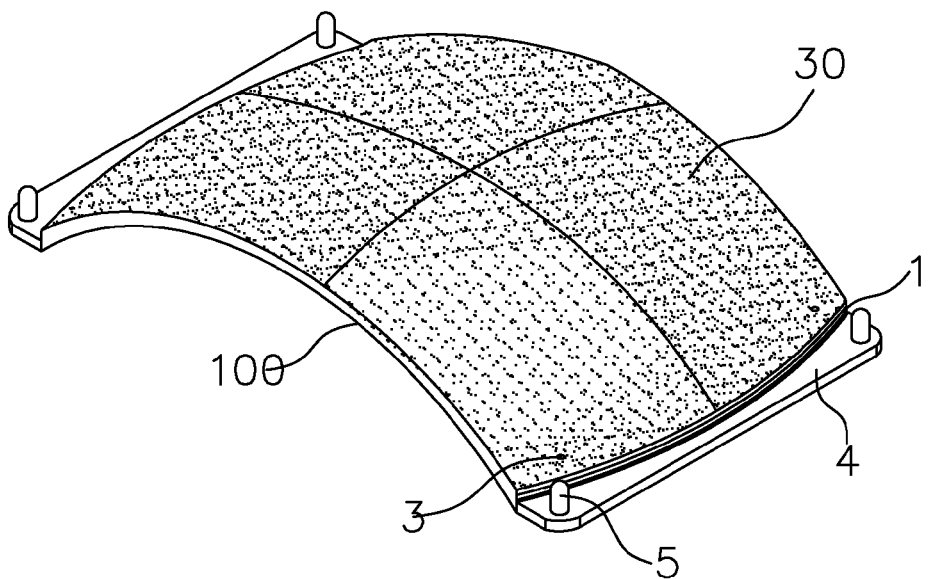
FIG. 11 is a perspective view showing the polarized lens according to a second embodiment of the present invention.

As shown in FIG. 11, the nylon polarized lens according to a second embodiment of the present invention comprises a nylon material layer 100 and a polarized film 30. The nylon material layer 100 has four corners formed with positioning portions which are adapted to position the polarized film 30. In this embodiment, the positioning portions are apertures 3 formed at the four corners of the nylon material layer 100. The apertures 3 are for insertion of positioning needles of a mold to position the polarized film 30. The feature of the present invention is that the nylon material layer 100 has buffer grooves 1 at two opposing end surfaces thereof.

In this embodiment, the nylon material layer 100 has positioning flat surfaces 4 at two opposing sides thereof. The two positioning flat surfaces 4 have protrusions 5 formed at four corners of the two positioning flat surfaces 4. Through the protrusions 5, there is a gap between the stacked lenses to prevent the lenses from being damaged due to touching. The packing is more convenient and the cost is lowered.

Figure 12:
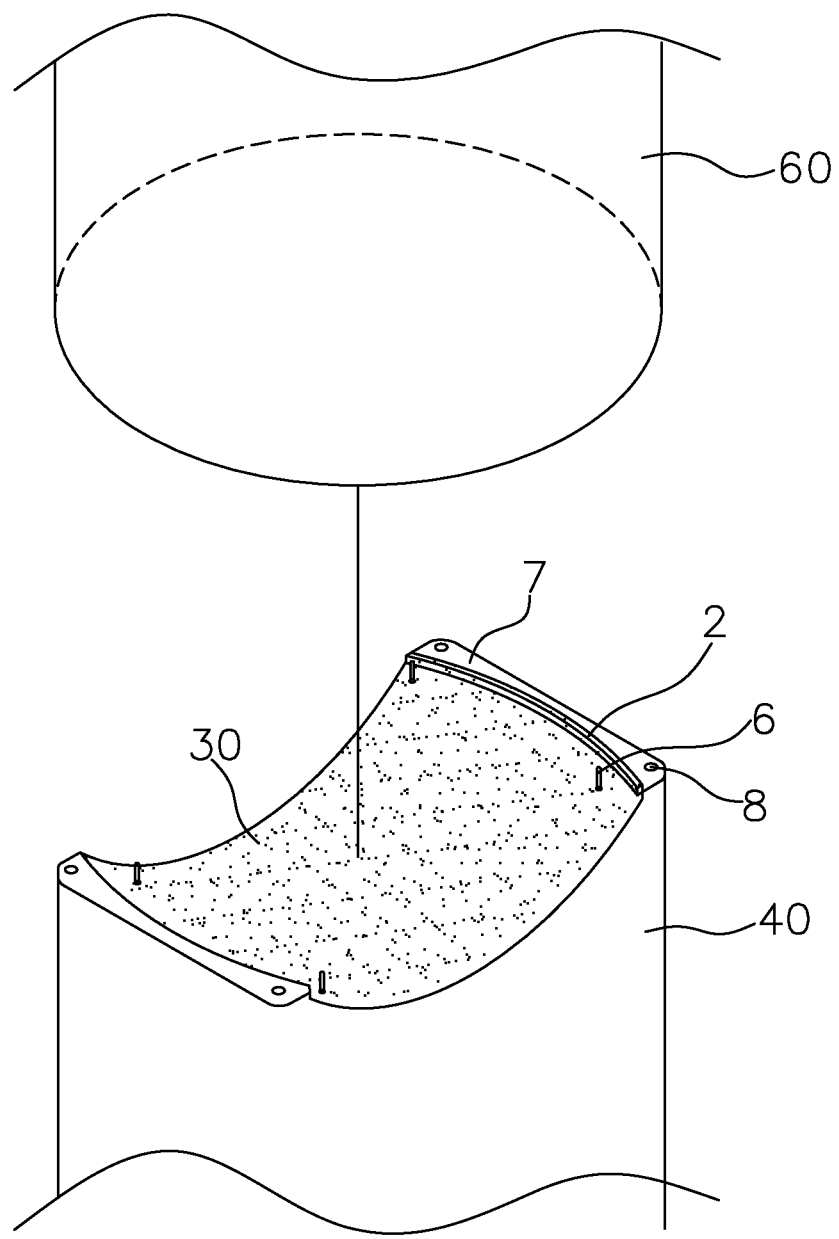
FIG. 12 is an exploded view showing the moulding mold for the polarized lens according to the second embodiment of the present invention.
Figure 13:
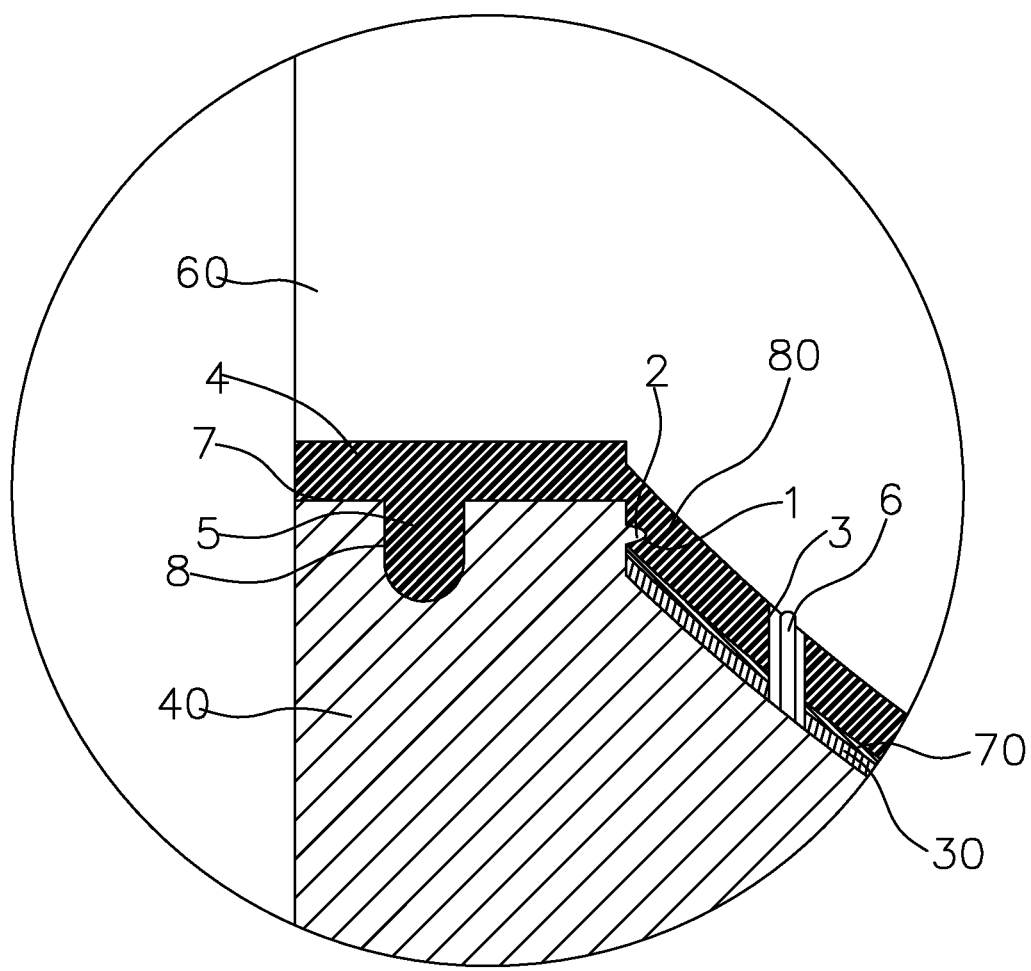
FIG. 13 is a schematic showing the mold closing of the moulding mold for the polarized lens according to the second embodiment of the present invention.

As shown in FIG. 12 and FIG. 13, the moulding mold to manufacture the aforesaid nylon polarized lens of the second embodiment comprises an upper die 60 and a lower die 40. The lower die 40 has a top surface which is an arc concave surface. Two opposing sides of the top surface of the lower die 40 are formed with buffer flanges 2 which are adapted to form the buffer grooves 1 of the nylon polarized lens. The top surface of the lower die 40 is further formed with positioning portions to position the polarized film 30. As shown in FIG. 12, the top surface of the lower die 40 is formed with positioning needles 60 to constitute the positioning portions. The positioning needles 60 correspond in position to the apertures 3 to position the polarized film 30. The upper die 60 has a bottom surface which is an arc convex surface. The upper die 60 cooperates with the lower die 40 to form a chamber for shaping the lens. In this embodiment, the top surface of the lower die 40 is formed with two platforms 7 which are adapted to form the two positioning surfaces 4 of the nylon polarized lens. The two platforms 7 have concave holes 8 at four corners thereof. The concave holes 8 are adapted to form the protrusions 5.

As shown in FIG. 13, during the injection molding of this embodiment, the melting plastic 80 is injected into the injection space and stopped by the buffer flanges 2, not on the edge of the polarized film 30 to flush adhesive glue 70. This way can prevent the adhesive glue from being flushed. Thus, there is no need for the plastic layer 90 to be attached to the adhesive glue 70 of the polarized film 30 of the present invention. The adhesive glue 70 is direct attached to the surface of the polarized film 30, without sticking the plastic layer 90 in advance. The thickness of the thin lens is about 2 mm to save the plastic material. The present invention is applied to manufacture high-class nylon polarized lenses. The present invention can ensure the quality of products and increase the work efficiency and enhance the product level.

The feature of the present invention is that the nylon material layer 100 has the buffer grooves 1 at two opposing end surfaces thereof. Two opposing sides of the top surface of the lower die 40 are formed with the buffer flanges 2. The present invention can prevent the adhesive glue from being flushed for injection molding to ensure the quality of products and increase the work efficiency. The present invention is applied to manufacture thin and expensive polarized lenses. The positioning portions to position the polarized film 30 are not limited to the aforesaid embodiments. The positioning surfaces 4 and the protrusions 5 of the nylon polarized lens and the platforms 7 and the concave holes 8 of the mold may be provided as desired.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A nylon polarized lens, which is of a size X and a thickness of about 2 mm, comprising
    a polarized film, including
        an adhesive glue, further including
            an upper surface directly attached to a melting plastic and
            a lower surface directly attached to the polarized film; and
    a nylon material layer of the size X, including
        i) four corners formed with positioning portions to position the polarized film, and
        ii) buffer grooves formed respectively along two opposing edges thereof for receiving the melting plastic which is obstructed, during a process of injection molding, by a buffer flange formed right above an end of each of the buffer grooves.

2. The nylon polarized lens, wherein the nylon material layer has two positioning flat surfaces at two opposing sides thereof, and the two positioning flat surfaces have protrusions formed at four corners of the two positioning flat surfaces.

3. The nylon polarized lens, wherein the four corners of the nylon material layer are formed with apertures for insertion of positioning needles of a mold to position the polarized film.

4. The nylon polarized lens, wherein the four corners of the nylon material layer are formed with concaved portions, and an outer surface of an area surrounded by the four concaved portions is adapted to bond the polarized film.

5. A moulding mold to manufacture a nylon polarized lens, with a thickness of about 2 mm, comprising an upper die and a lower die, the lower die having a top surface which is an arc concave surface, two opposing sides of the top surface of the lower die being formed with buffer flanges which are adapted to form buffer grooves of the nylon polarized lens, the top surface of the lower die being further formed with positioning portions to position a polarized film, the upper die having a bottom surface which is an arc convex surface, the upper die cooperating with the lower die to form a chamber for shaping the polarized lens, wherein during a process of injection molding the buffer grooves receive a melting plastic obstructed by the buffer flanges formed respectively right above an end of the buffer groove.

6. The moulding mold to manufacture a nylon polarized lens as claim 5, wherein the top surface of the lower die is formed with two platforms which are adapted to form two positioning surfaces of the nylon polarized lens, the two platforms have concave holes at four corners thereof, and the concave holes are adapted to form protrusions.

7. The moulding mold to manufacture a nylon polarized lens as claimed in claim 5, wherein the top surface of the lower die is formed with positioning needles to position the polarized film.

8. A moulding mold to manufacture a nylon polarized lens as claimed in claim 5, wherein four corners of the top surface of the lower die are formed with four protruding portions, and an area surrounded by the four protruding portions is adapted to bond the polarized film gated beams.

* * * * *